L. B. MURRAY.
STOCK WATERING TANK.
APPLICATION FILED SEPT. 15, 1917.
1,254,838.
Patented Jan. 29, 1918.
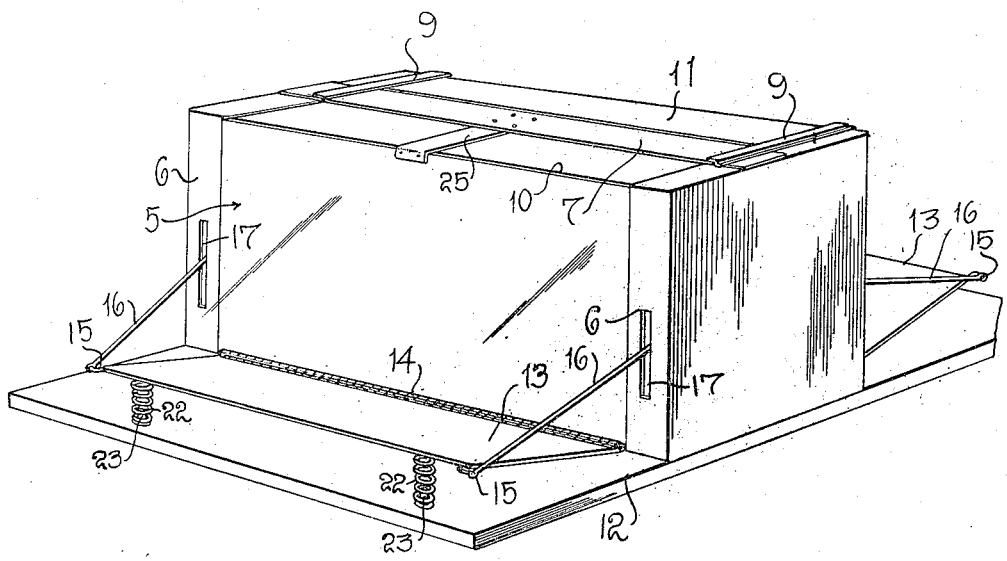
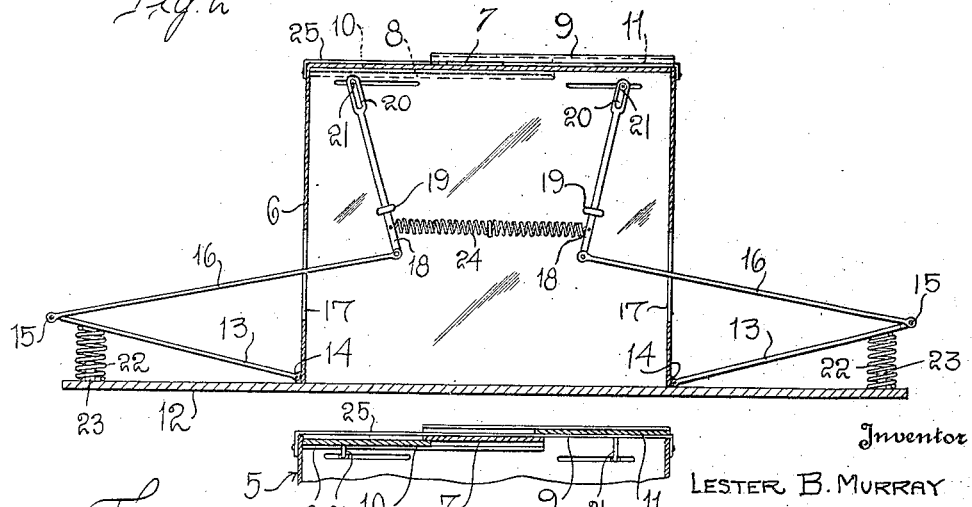
Inventor
LESTER B. MURRAY
By Watson E. Coleman
Attorney

UNITED STATES PATENT OFFICE.

LESTER B. MURRAY, OF KENOSHA, WISCONSIN.

STOCK-WATERING TANK.

1,254,838. Specification of Letters Patent. Patented Jan. 29, 1918.

Application filed September 15, 1917. Serial No. 191,627.

*To all whom it may concern:*

Be it known that I, LESTER B. MURRAY, a citizen of the United States, residing at Kenosha, in the county of Kenosha and State of Wisconsin, have invented certain new and useful Improvements in Stock-Watering Tanks, of which the following is a specification, reference being had to the accompanying drawings.

This invention relates to an improved stock watering tank, and has for its primary object to provide a device of this character which will be relatively simple in its construction and absolutely sanitary, the tank being completely closed under normal conditions so as to prevent the entrance of dirt and other foreign material to the interior thereof.

It is another and more particular object of the invention to provide a stock tank having a central longitudinal wall extending across the top thereof, and covers at each side of said wall mounted for sliding movement respectively beneath and above the central wall and normally closing the openings in the top of the tank at each side of said wall, and animal actuated means for sliding said covers to open position.

It is also a further general object of my invention to provide a stock watering tank as above characterized, which may be produced at relatively small manufacturing cost and is highly serviceable and efficient in practical use.

With the above and other objects in view, my invention consists in the novel features of construction, combination and arrangement of parts to be hereinafter more fully described, claimed, and illustrated in the accompanying drawing, in which, Figure 1 is a perspective view of a stock watering tank constructed in accordance with the preferred embodiment of my invention;

Fig. 2 is a vertical section through one of the end casings of the tank, illustrating the operating connections between the hinged platforms and the cover section; and Fig. 3 is a sectional view through the top of the tank.

Referring in detail to the drawing, 5 designates the tank body which, in the illustrated embodiment of the invention, is of rectangular form. To each end wall of the tank body, exteriorly thereof, a rectangular casing 6 is secured. A central longitudinal bar 7 connects the end walls of the tank at the top thereof and, upon the inner faces of the end walls at opposite sides of said central bar, the guides 8 and 9 respectively are secured, the guides at one side of the central bar being disposed in a different plane from those on the opposite side thereof. 10 and 11 designate the cover sections which are slidably engaged at their ends in the respective guides 8 and 9. The cover section 10 has inward sliding movement beneath the central longitudinal bar 7, while the other cover section 11 is adapted to slide over said bar.

A wood or metal base indicated at 12 is secured to the bottom of the tank, and upon this base at the lower end of each of the side walls of the tank, platforms 13 are arranged as at 14. Each platform is provided at its ends and at its free longitudinal edges with laterally projecting pins or studs 15 upon which the rods 16 are loosely engaged at one of their ends. These rods extend upwardly and inwardly through slots 17 in the end walls of the casing 6 and at their inner ends are loosely connected to the lower ends of levers 18. These levers are slidably and pivotally movable in guide eyes 19 and the upper ends of the levers are slotted, as at 20, and engaged upon laterally extending pins 21 fixed to opposite ends of the cover sections 10 and 11, said pins being movable in slots or recesses in the end walls of the tank 5.

The platforms 13 at the outer longitudinal edges are urged upwardly by coil springs 22, the lower ends of said springs being engaged upon stops 23 which limit the downward movement of the platform.

Coil springs 24 are fixed at one of their ends to the end walls of the tank 5 and have their other ends connected to the respective levers 18 adjacent the lower ends of the latter, said springs 24 by their contractile action normally tending to move the upper ends of the levers 18 outwardly and thus move the cover sections to closed position.

The side walls of the tank body 5 at their upper edges are connected by a central transverse bar 25 which serves as an additional bracing and supporting means for the cover sections, the central part of said bar being also secured to the longitudinal bar 7.

From the foregoing description, taken in connection with the accompanying drawing, the construction and manner of operation of the device in practical use will be clearly understood. When the animal treads upon the outer edge of either of the platforms 13, the same is forced downwardly against the action of the springs 22 and the inner ends of the rods 16 which are connected to said platform are moved upwardly and outwardly. The rods 18 are thereby shifted in the guide eyes 19 and the cover section to which said rods are connected is moved inwardly to its open position. Thus, one side of the tank will be opened so that the animal may obtain access to the water therein. As soon as pressure upon the platform 13 is released, the springs 24 connected to the rods 18 will act to immediately return the cover section to its closed position. Thus, it will be appreciated that under normal conditions, the tank is completely closed and dust, dirt, and other foreign matter cannot enter the same and contaminate the water. The cover operating levers being housed within the casing 6 are not liable to injury by the animal striking against the same or through other causes. The device as a whole consists of relatively few parts which are positive and reliable in their operation. The tank can, of course, be constructed in any desired size and of other shapes than that shown in the accompanying drawing. The device is also capable of manufacture at relatively small cost.

While I have herein shown and described the preferred construction and arrangement of the several parts, it is to be understood that the device is susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

1. In a stock watering tank, a tank body having a central longitudinal bar extending across the top thereof, slidable cover plates normally closing the top of the tank at opposite sides of said bar, one of said cover plates being movable beneath said central bar and the other cover plate over the central bar, and animal actuated means for independently moving the cover plates to open position.

2. In a stock watering tank, a tank body having a central longitudinal bar extending across the top thereof, slidable cover plates normally closing the top of the tank at opposite sides of said bar, one of said cover plates being movable beneath said central bar and the other cover plate over the central bar, platforms hinged along one of their longitudinal edges, means yieldingly supporting the other longitudinal edges of the platform, and means operatively connecting the ends of the platform at the latter edge thereof to the respective cover plates to move the cover plate to its open position when the free edge of the platform is forced downwardly.

3. In a stock watering tank, a tank body having a central longitudinal bar extending across the top thereof, slidable cover plates normally closing the top of the tank at opposite sides of said bar, one of said cover plates being movable beneath said central bar and the other cover plate over the central bar, platforms hinged along one of their longitudinal edges, means yieldingly supporting the other longitudinal edges of the platform, casings secured upon the opposite ends of the tank, levers pivotally and slidably movable in said casings and operatively connected at one of their ends to the respective cover plates, and rods rigidly connected at one of their ends to the free edge of the platform and operatively connected at their other ends to the lower ends of said levers to actuate the latter when an animal treads on the platform and shift the cover plates to their open positions.

In testimony whereof I hereunto affix my signature in the presence of two witnesses.

LESTER B. MURRAY.

Witnesses:
JAMES PENNEFEATHER,
EMMA SIMONS.

Copies of this patent may be obtained for five cents each, by addressing the "Commissioner of Patents, Washington, D. C."